Dec. 29, 1942.  D. M. LIGHT  2,306,392
FRICTION ABSORBING DEVICE
Filed Dec. 15, 1938  4 Sheets-Sheet 1
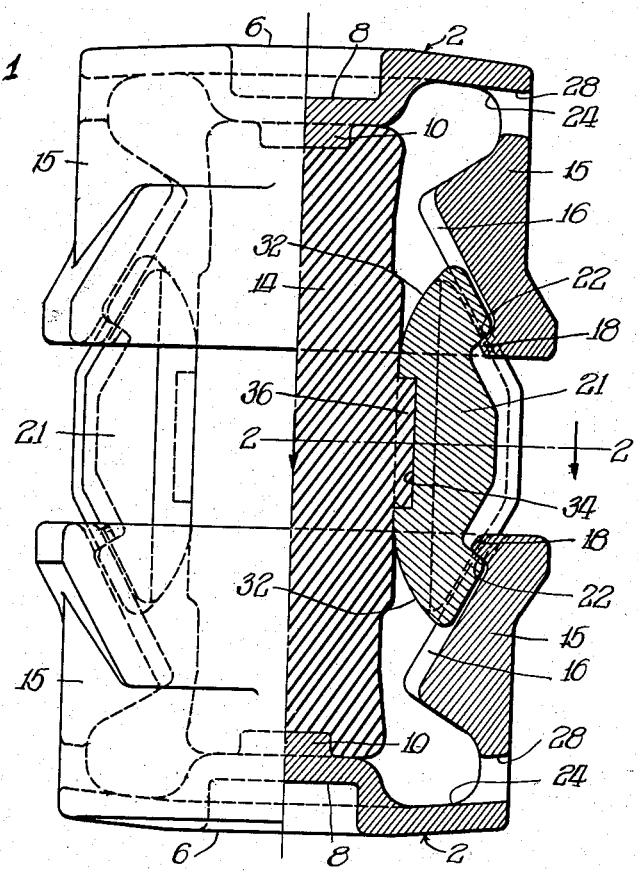
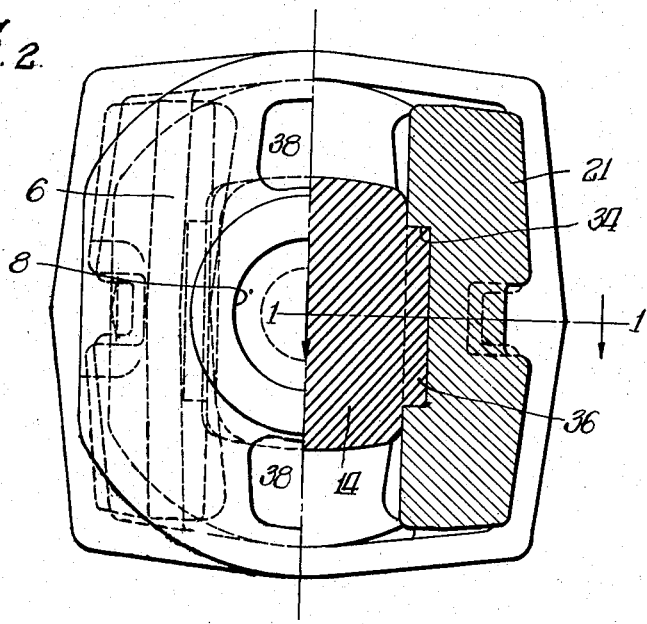
INVENTOR.
David M. Light,
BY
ATTORNEY.

Dec. 29, 1942.  D. M. LIGHT  2,306,392
FRICTION ABSORBING DEVICE
Filed Dec. 15, 1938  4 Sheets-Sheet 2
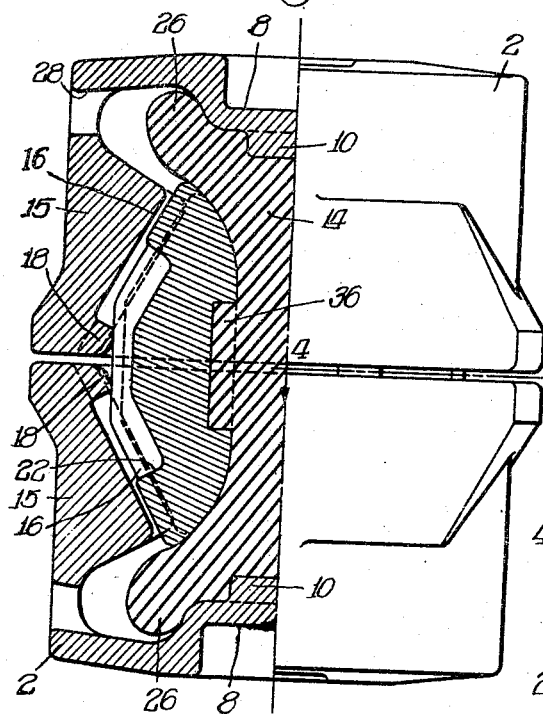
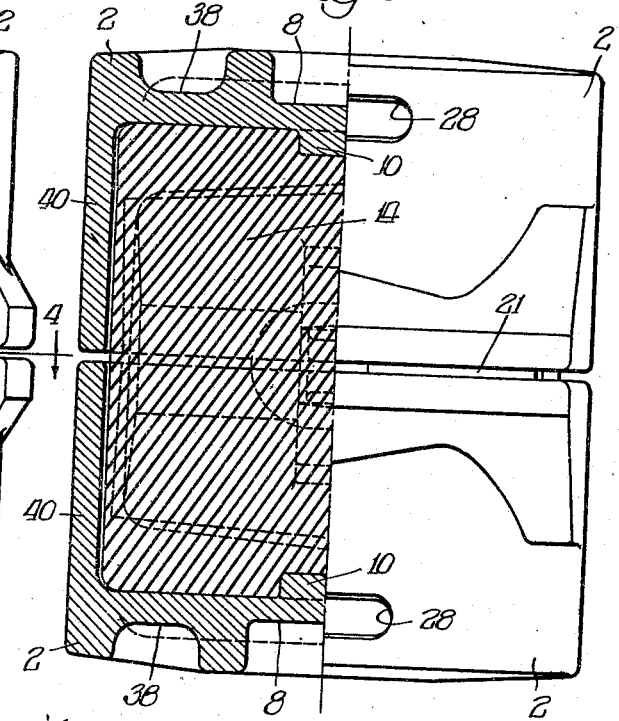
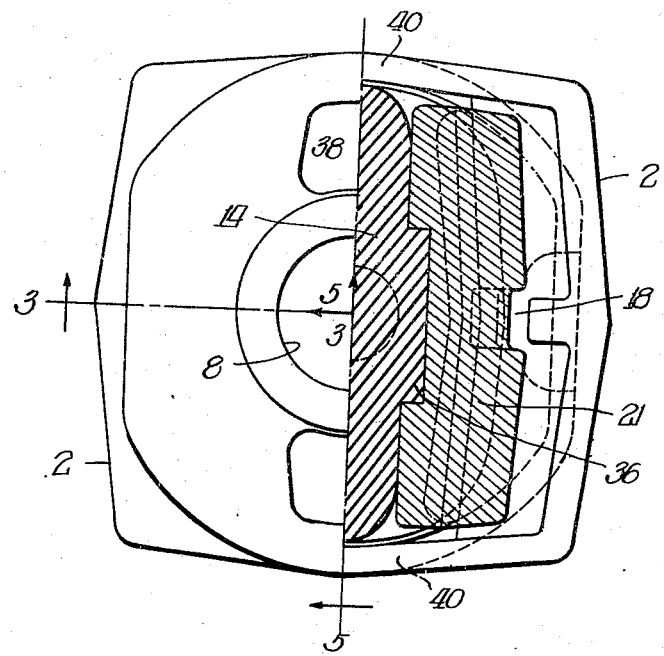
INVENTOR.
David M. Light,
BY Orin O. B. Garner
ATTORNEY.

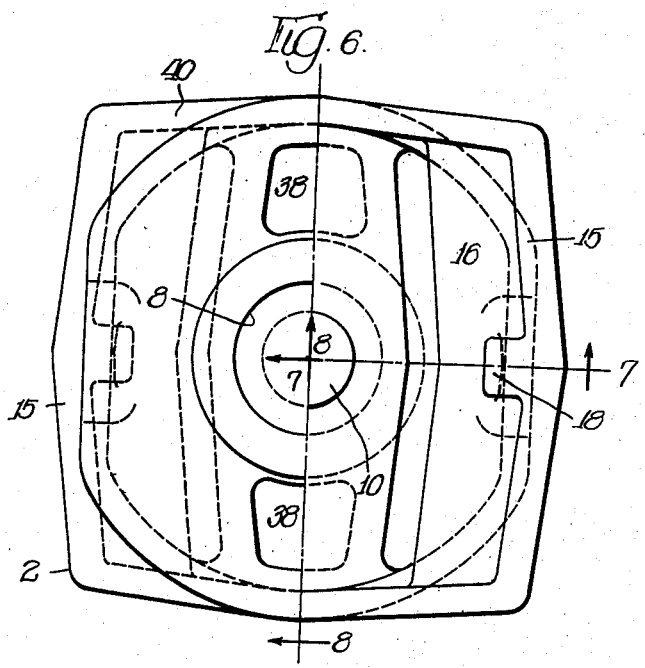
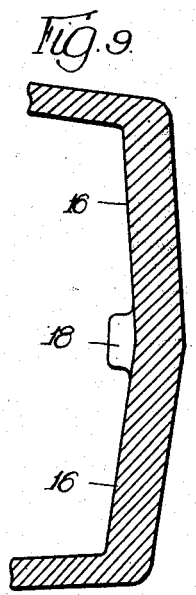
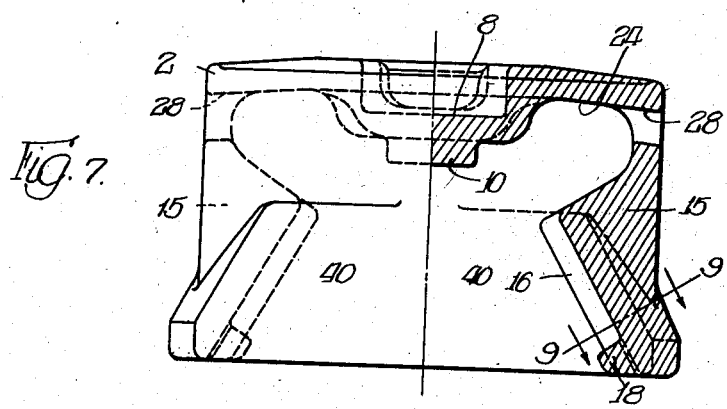
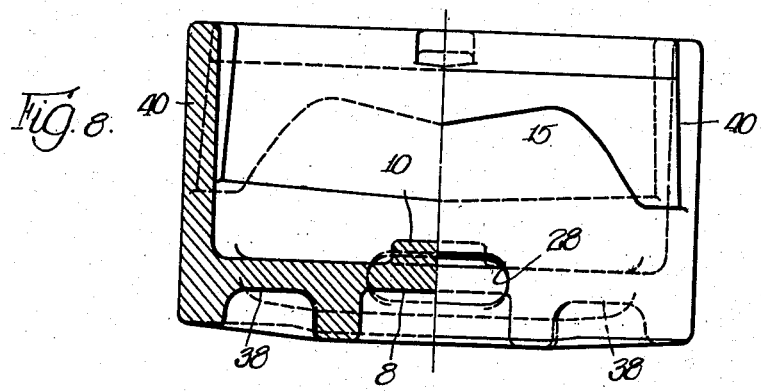

Dec. 29, 1942.  D. M. LIGHT  2,306,392
FRICTION ABSORBING DEVICE
Filed Dec. 15, 1938  4 Sheets-Sheet 4
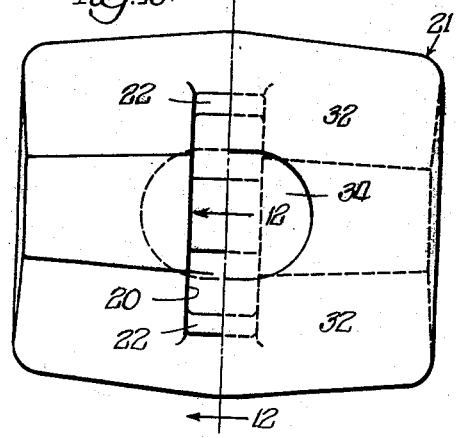
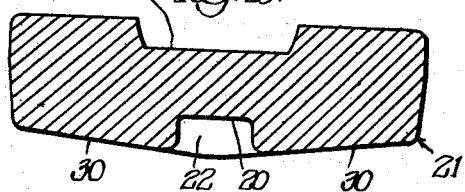
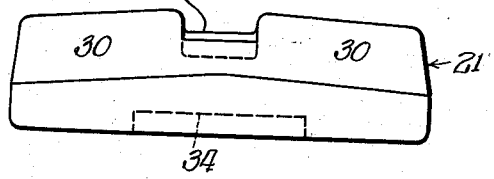
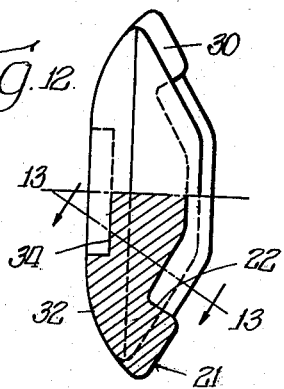
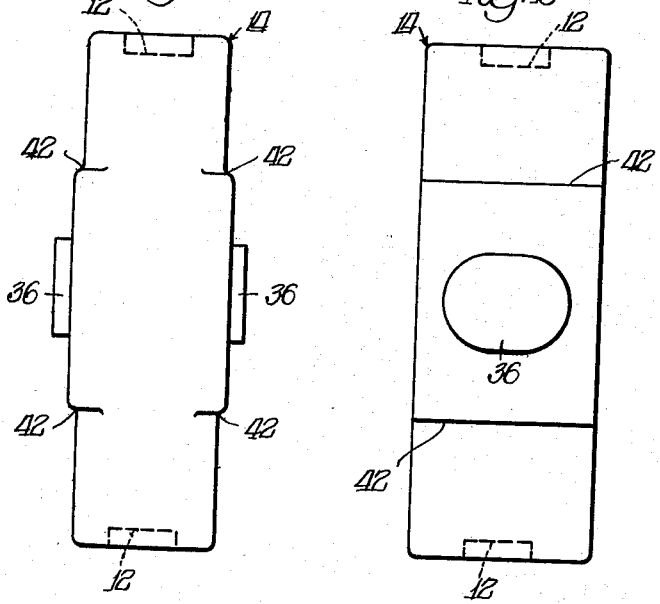
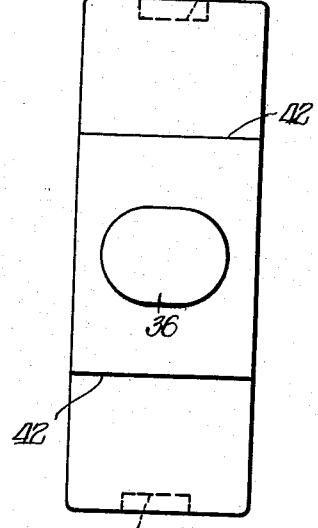
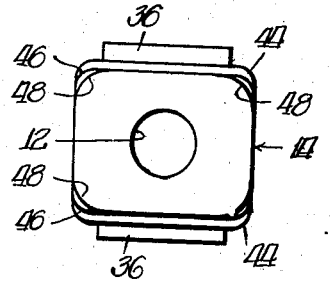
INVENTOR.
David M Light,
BY
ATTORNEY.

Patented Dec. 29, 1942

2,306,392

UNITED STATES PATENT OFFICE 2,306,392

FRICTION ABSORBING DEVICE

David M. Light, Chicago, Ill., assignor to American Steel Foundries, Chicago, Ill., a corporation of New Jersey Application December 15, 1938, Serial No. 245,946

36 Claims. (Cl. 267—9)

My invention relates to a friction absorbing device of the type commonly used on railway equipment in substitution of one or more coil springs.

Heretofore great difficulty has been encountered in such friction absorbing devices, or snubbers as they are commonly called, owing to the extremely limited space available for such a device in which the friction absorbing requirement is relatively large.

I have solved the difficulty by utilizing a single resilient means which is operative to expand the device to its normal open position after a closing stroke and is also operative to maintain the side wedges tightly engaged against the friction surfaces normally provided on the top and bottom followers. Heretofore it has been found necessary to utilize one resilient means for urging the top and bottom followers apart after closing and another resilient means for urging the side wedges into frictional engagement with said followers. In overcoming this difficulty I have made available more space for the construction of parts which must be worn away by the friction absorption.

An object of my invention is to devise a friction absorbing device suitable for use in replacing the single coil spring in a railway freight car, said device comprising a single resilient member.

Another object of my invention is to devise a friction absorbing device comprising a minimum number of parts of a form adaptable for most efficient and inexpensive production.

My novel device in the embodiment shown herein consists of only five parts, two of which are duplicates of each other so that actually the device comprises only three piece parts.

My invention further comprehends a form of shock absorbing device employing a single resilient means capable of expanding in all planes and thereby effective to produce vertical motion of certain parts with which it is in direct engagement and horizontal motion of other parts with which it is also in direct engagement. My novel device contemplates the use of top and bottom follower members and side wedge members in engagement therewith, and a single resilient element under compression between all of said members affording a direct force path from each of said members to every other thereof.

My invention also contemplates a novel form of resilient means which is capable of producing the above mentioned results.

Figure 1 is a view of an embodiment of my novel friction absorbing device, the left half thereof being in elevation and the right half a sectional view in the vertical plane bisecting the device and substantially as indicated by the line 1—1 of Figure 2. In this view the device is shown in its expanded form when not under load.

Figure 2 is a top view of the device shown in Figure 1, the left half thereof showing the top plan and the right half showing a sectional view in the horizontal plane bisecting the device and substantially as indicated by the line 2—2 of Figure 1.

Figure 3 is an elevational view of the device shown in Figure 1 with the parts compressed to their maximum, the right half of the figure being in elevation and the left half thereof a section in the vertical plane bisecting the device substantially as indicated by the line 3—3 of Figure 4.

Figure 4 is a half top plan and half section, the section being taken in the horizontal plane bisecting the device undner maximum compression and substantially as indicated by the line 4—4 of Figure 3.

Figure 5 is a view, half in elevation and half in section, of the fully compressed device, the elevational view being taken from the right as seen in Figure 3 and the section in a vertical plane bisecting the device substantially as indicated by the line 5—5 of Figure 4.

Figure 6 is a plan view of the spring cap or follower, the left half showing the top plan view and the right half the bottom plan view thereof.

Figure 7 is an elevational view, half in secttion, of the spring cap, the elevational view being taken from the bottom as seen in Figure 6 and the section being taken in the vertical plane substantially as indicated by the line 7—7 of Figure 6.

Figure 8 is a side elevation taken from the right as seen in Figure 6, half in section, the section being taken in the vertical plane bisecting the follower and substantially as indicated by the line 8—8 of Figure 6.

Figure 9 is a further sectional view through one wedge engaging friction surface of the follower, the section being taken substantially vertically with respect to said surface and as indicated by the line 9—9 of Figure 7.

Figure 10 is a plan view of the side wedge, the left half thereof showing the outer face and the right half the inner face thereof.

Figure 11 is a side elevation of the wedge.

Figure 12 is an end elevation of the wedge, half in section, the section being taken in the plane bisecting the wedge along its short axis and substantially as indicated by the line 12—12 of Figure 10.

Figure 13 is a sectional view through the friction surfaces of the wedge in a plane substantially normal to said surfaces and as indicated by the line 13—13 of Figure 12.

Figure 14 is an elevational view of my novel form of resilient means.

Figure 15 is a further elevational view taken at right angles to the view of Figure 14.

Figure 16 is a top plan view of said resilient means.

Describing my novel device in greater detail, it comprises the top and bottom followers 2, 2 of identical form, each comprising a rectangular cup-like structure flaring slightly toward its open end and somewhat arcuate or rounded on the outer face as indicated at 6, 6 to provide suitable seating means for the device. Centrally located in the outer wall is the circular recess 8 convenient for the reception of positioning means in the form of a lug or other device provided upon the truck member against which the device may be seated. Inwardly of the recess 8 is formed the lug 10 which projects into the cavity 12 formed on the end of the resilient means or spring generally indicated at 14, said lug thus serving as a positioning means for the end of said spring. On opposite side walls 15, 15 of the follower are formed the shallow V-shaped diagonally arranged friction surfaces indicated at 16, 16 (Figure 1), said friction surfaces extending entirely across the inner faces of said walls as best seen from the sectional view shown in Figure 9. Centrally formed on the friction walls at their open end are the retaining lugs 18, 18, said lugs being received in the centrally formed slots 20, 20 (Figure 13) formed on the outer or friction faces of the side wedge 21, said lugs having abutment as at 22, 22 against the ends of said slots to retain the parts in assembly. Outwardly of the friction surfaces 16, 16 on the followers are formed the cavities 24, 24 receiving the surplus portions of the resilient means when under compression as best seen at 26, 26 in Figure 3. Leading from the cavities 24 are the channels or slots 28, 28, said slots forming a convenient means of core removal in the operation of casting, said slots conveniently permitting drainage and escape of other extraneous matter.

The side wedge 21 is of the form shown in detail in Figures 10 to 13 and comprises a generally rectangular flat piece of solid metal having on its outer face the diagonally arranged wedge-shaped friction faces 30, 30 complementary in form to the V-shaped friction surfaces 16, 16 on the top and bottom followers. The shape of the central slot 20 is best seen from a consideration of Figures 10 and 12, said slot receiving the positioning lugs 18, 18 of the followers. The inner face of the wedge block 21 is of generally cylindrical form, somewhat flattened at the central portion, and arcuate at the top and bottom as indicated at 32, 32 to permit the smooth flowing of the resilient means 14 under changing loads as the device is compressed or expands after compression. Centrally formed on said inner face is the oval cavity 34 receiving the lug 36 centrally formed on the side of the resilient means 14 as best seen in the detail views of Figures 14 and 15 of said resilient member.

The outer faces of the followers are cored out as indicated at 38 (Figures 2 and 5), thus projecting the outer wall inwardly of the casting for abutment of the expanding resilient means 14 under compression, and so confining the flow of said resilient means 14 to increase its resistance.

The detail of the resilient means or rubber spring 14 is shown in Figures 14, 15 and 16. The said resilient means consists of a rectangular body of rubber composition having the beforementioned centrally located positioning means 36, 36 on opposite wedge engaging sides and presenting at its opposite ends the centrally located circular cavities 12, 12 receiving the beforementioned positioning means on the followers. The central body of the rubber block or resilient means is of slightly larger dimensions than the remainder thereof, the difference being indicated at the ledges 42, 42 where the end portions merge with the central body portion. The said ledges appear only on two sides of the resilient means so that when viewed in the other elevation as shown in Figure 15 the thickness of the block or width thereof is constant. Radii are formed at all corners and edges except about the positioning lugs as indicated at 42 and 44 for the main body portion and at 46 and 48 for the end portions, said radii for the end portions being substantially increased at the extremities thereof as indicated at 48, 48. The said radii serve to permit the even flowing of the rubber as it is compressed into the form shown in Figures 3, 4 and 5 without developing undue stress localizations which might break down the structure.

In operation, application of a load to my novel shock absorbing device urges the top and bottom followers toward each other, such movement being resisted by the resilient member which has abutment with each of said followers against the end walls thereof. As said followers are compressed they slide along the friction surfaces of the side wedges with which they engage, thus moving the side wedges toward each other and compressing the central portion of the resilient member, thus adding further resistance to the forces acting to move the end followers together. By this movement the central resilient member is further compressed and it is compelled to flow into the available space until under full compression the device assumes the form best shown in Figures 3, 4 and 5. Upon release of the load the parts assume the normal position shown in Figure 1. It will readily be understood that the amount of distortion of the resilient member will depend upon the load applied, upon the character of the material of which said resilient member is formed, and upon the arrangement of the friction surfaces determining the amount of frictional absorption engendered thereby. These factors are all within the control of the designer in my novel device inasmuch as more space is permitted within the limitations embodied than is possible where other forms of friction elements are availed of.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a friction absorbing device, identical top and bottom followers each having opposed V-shaped tapering internal friction faces, lateral wedges interposed between said followers, each of said wedges having opposed tapered wedge-shaped external surfaces engaging said faces at opposite sides of said device, and a resilient member interposed between said wedges and said followers and urging them into tight engagement, said resilient member being compressible within said device both vertically and horizontally thereof to permit said followers and said wedges to approach each other respectively as said device is placed under load.

2. In a friction absorbing device, identical top and bottom followers each having a plurality of tapering internal friction faces, identical side wedges interposed between said followers and having tapering external friction surfaces complementary to said faces and in engagement therewith, and a resilient member interposed between said wedges and followers, said resilient member being compressible and expansible vertically and laterally to urge said followers and wedges into tight engagement with each other under operative conditions.

3. In a shock absorber, end members in the form of housings having opposed internal friction faces, side wedges having external friction surfaces complementary to said faces and in engagement therewith, and a resilient member compressed between and having abutment with said wedges and end members, said resilient member being free to flow into end cavities of said housings when said device is placed under compression, and positioning means on said resilient member engaging positioning means on said end members and on said wedges.

4. In a shock absorber, end housings having cavities and diagonal internal friction faces, side wedges having diagonal external friction surfaces engaging said faces, means on said housings engaging means on said wedges to retain said parts in assembly, and a resilient member confined between said housings and said wedges to retain said device in its expanded form, said member being compressible under load into said cavities and expansible from said cavities as said load is released.

5. In a friction absorbing device, identical top and bottom followers having internal tapering friction faces, identical lateral wedges having external friction surfaces in engagement with said faces, and a resilient member abutting said wedges and said followers to urge them into tight engagement, said resilient member being compressible both vertically and laterally to permit said followers and said wedges respectively to approach each other under compression.

6. In a friction absorbing device, top and bottom followers having internal friction faces, lateral wedges having external friction surfaces abutting said faces, and a resilient member having abutment with said wedges and followers to urge them into tight engagement, said follower friction faces being of V-shaped form and said wedge friction surfaces being of wedge-shaped form complementary to said faces.

7. In a friction absorbing device, top and bottom followers having internal friction faces, lateral wedges having external friction surfaces abutting said faces, and a resilient member having abutment with said wedges and followers to urge them into tight engagement, said follower friction faces being V-shaped and said wedge friction surfaces being wedge-shaped, said surfaces and faces being of complementary form and having slidable engagement with each other.

8. In a friction absorbing device, identical top and bottom followers each having opposed V-shaped tapering internal friction faces, lateral wedges interposed between said followers, each of said wedges having opposed tapered wedge-shaped external surfaces engaging said faces at opposite sides of said device, and a resilient member in abutment with said wedges and said followers and urging them into tight engagement.

9. In a shock absorber, end members in the form of housings having opposed internal friction faces, side wedges having external friction surfaces complementary to said faces and in engagement therewith, and a resilient member compressed between and having abutment with said wedges and end members, said resilient member being free to flow into end cavities of said housings when said device is placed under compression.

10. In a friction absorbing device, top and bottom followers having internal V-shaped friction faces, lateral side wedges having external wedge-shaped friction faces in engagement with said V-shaped faces, and a resilient member having bearing against said wedges and followers to urge them into tight engagement.

11. In a friction absorbing device, identical top and bottom followers each having a plurality of tapering internal friction faces, identical side wedges interposed between said followers and having tapering external friction surfaces complementary to said faces and in engagement therewith, and a resilient member interposed between said wedges and followers, in abutment therewith.

12. In a friction absorbing device, a resilient member expansible both vertically and laterally and comprising a solid body of material of generally rectangular section and having end portions with corner radii gradually increasing to a maximum at the ends thereof, and positioning means on the sides and ends of said member.

13. In a shock absorber, end housings having internal friction faces, lateral wedges having external friction surfaces engaging said faces, cavities in said housings adjacent the ends thereof, and a resilient member abutting said housings and wedges and free to flow into said cavities when said device is placed under load.

14. In a shock absorber, housings having internal friction faces, side wedges having external friction surfaces engaging said faces, engaging means on the walls of said housings and on said wedges to retain said parts in assembly, and a resilient member confined and compressed between said housings and wedges in abutment therewith and further compressible as said device is placed under load.

15. In a friction absorbing device, top and bottom follower members having internal friction faces, side wedge members having external friction faces engaging said internal friction faces, and a resilient means having bearing against all of said members to urge said members outwardly.

16. In a friction absorbing device, identical top and bottom followers having internal tapering friction faces, identical lateral wedges having external friction surfaces in engagement with said faces, and a resilient member abutting said wedges and said followers to urge them into tight engagement.

17. In a friction absorbing device, a resilient member comprising a solid block of material of generally rectangular form, the extremities of said block having corners of radii gradually increasing to a maximum at the ends thereof, and positioning means on the ends and on opposite sides of said member.

18. In a friction absorbing device, a resilient member expansible both vertically and laterally and comprising a solid body of material of generally rectangular section with end portions having corner radii gradually increasing to a maximum at the ends thereof.

19. In a friction device, top and bottom follower members having internal friction faces, side wedge members having friction surfaces engaging said faces, and resilient means compressed between all of said members and affording a direct force path from each of said members to every other thereof.

20. In a shock absorber, an end housing having a generally cylindrical form with internal cavities adjacent the base thereof to accommodate smooth flowing of a compressed resilient member therein and expanding from said cylindrical formation toward the open end into a generally rectangular form serving to provide a maximum of metal for frictional wear adjacent said open end.

21. In a shock absorber, pairs of top and bottom followers and side wedges having complementary engaging friction surfaces, and a resilient member compressed between said followers and wedges and further compressible by abutment therewith as said device is placed under load.

22. In a frictional device, follower members and wedge members having complementary friction surfaces in abutment with each other, and a single resilient element compressed by and between all of said members in normal position and further compressible therebetween as said device is compacted under load.

23. In a friction device, a pair of follower members, a pair of side wedge members, said wedge and follower members having frictional surfaces in engagement with each other, and a resilient element compressed between said members in normal position and further compressible therebetween as said device is placed under load.

24. A friction device comprising end follower members and side wedge members having frictional engagement with each other, and a resilient element compressed between all of said members urging them into tight engagement.

25. A friction device comprising end follower members and side wedge members having frictional engagement with each other, a resilient element compressed between all of said members urging them into tight engagement, and interengaging retaining means on said members.

26. In a friction absorbing device, a single resilient member, and a plurality of sets of interlocked friction elements abutting said member and urged into frictional engagement thereby.

27. A resilient unit for use in bolster supporting spring assemblies comprising a lower follower, an upper follower, friction shoes engaging said followers, and an expansible resilient element engaged by said shoes and followers.

28. In a friction spring supporting unit, a pair of chambered followers having inclined wedging faces, friction shoes each engaging a wedging face on each follower, and a rubber element between said shoes and being adapted to be compressed vertically when said unit is compressed.

29. In a friction spring supporting unit, a pair of followers, at least one of which has inclined wedging faces, friction shoes each engaging one of said wedging faces, and an elongated compressible rubber means engaging said shoes and adapted to be compressed in the direction of its longitudinal axis by said followers and along its transverse axis by said shoes.

30. In a spring unit, a pair of followers, at least one of which has a friction surface, shoes engaging both of said followers and frictionally engaging said surface, rubber means extending axially of said unit, engaging one of said followers, and adapted to assist in supporting a load on said unit, said rubber means being compressed in the direction of the axis of said unit when the latter is compressed, and means cooperating with said rubber means for forcing said shoes into greater frictional contact with said surface when said unit is compressed.

31. In a resilient supporting unit, a pair of followers, shoes engaging both of said followers and frictionally engaging at least one of them, rubber means laterally distortable and engaging at least one of said followers and compressible by the same in the direction of the longitudinal axis of said unit when the latter is compressed for forcing said shoes into frictional contact with at least one of said followers for resisting the further compression of said unit.

32. In a device of the class described, the combination of two members adapted to have relative movement along an axis and each having a barrel-like projection extending towards the other and providing an inner friction surface, a rubber block engaged at opposite ends by said two members and acting to resist the approach of said members, and a shoe located between the rubber block and each of said friction surfaces, said block capable of a limited deformation when pressed between said members and acting on the shoe to cause the same to bear against said friction surfaces whereby the force acting to cause the members to approach each other will be resisted not only by the rubber block but will be additionally resisted by friction of the shoe in its engagement with said members.

33. In a friction absorbing device, a single resilient member, and a plurality of sets of friction elements secured around said member in abutment therewith and urged into frictional engagement thereby.

34. A friction device comprising end follower members and side members having frictional engagement with each other, and a resilient element compressed between all of said members urging them into tight engagement.

35. In a friction spring supporting unit, a pair of chambered followers each having inclined wedging faces, friction shoes each engaging a wedging face on each follower, and means compressed by said followers and expanding against said shoes when said unit is compressed for forcing said shoes into frictional contact with said wedging faces.

36. In a friction spring supporting unit, a pair of chambered followers having inclined wedging faces, friction shoes each engaging a wedging face on each follower, a rubber block between said followers and expansible against said shoes when said unit is compressed for forcing said shoes into frictional contact with said wedging faces, and cooperating means between said followers and shoes for positioning said shoes within said unit when the same is released after compression.

DAVID M. LIGHT.